United States Patent [19]

Baker

[11] Patent Number: 4,518,016

[45] Date of Patent: May 21, 1985

[54] HOT MELT ADHESIVE HOSE CUFF

[75] Inventor: Robert G. Baker, Buford, Ga.

[73] Assignee: Nordson Corporation, Amherst, Ohio

[21] Appl. No.: 512,157

[22] Filed: Jul. 8, 1983

[51] Int. Cl.³ ............................................. B65D 59/00
[52] U.S. Cl. .................................. 138/96 R; 138/110; 285/45
[58] Field of Search ................... 138/96 R, 109, 96 T; 285/45, 253, 238, 419

[56] References Cited

U.S. PATENT DOCUMENTS

| D. 264,494 | 5/1982 | Chapa | 138/96 R X |
|---|---|---|---|
| 1,098,620 | 6/1914 | Gillar | 285/419 X |
| 1,230,854 | 6/1917 | Breuer | 285/253 X |
| 1,733,072 | 10/1929 | Pierce | 285/419 X |
| 1,931,703 | 10/1933 | McCrery | 138/96 T |
| 2,208,706 | 7/1940 | Spencer | 285/253 |
| 3,419,291 | 12/1968 | Tomb et al. | 138/109 X |
| 4,039,210 | 8/1977 | Wood et al. | 138/109 X |
| 4,114,929 | 9/1978 | Knapp | 285/45 |
| 4,236,736 | 12/1980 | Anderson | 285/419 X |

FOREIGN PATENT DOCUMENTS 2092092  8/1982  United Kingdom ............ 138/96 R

Primary Examiner—Stephen Marcus
Assistant Examiner—Mark Thronson
Attorney, Agent, or Firm—Michael L. Gill; Stephen T. Belsheim

[57] ABSTRACT

A rigid hose cuff for a heated hose for transporting molten hot melt adhesive. The cuff comprises a cylindrical body made of a rigid material. The cylindrical body is positioned on the hose adjacent a hose end having a fitting attached thereto. A two-piece collar is positioned on and then is connected to the cylindrical body. The collar engages the fitting so as to prevent relative rotational movement between the hose cuff and the hose.

3 Claims, 6 Drawing Figures

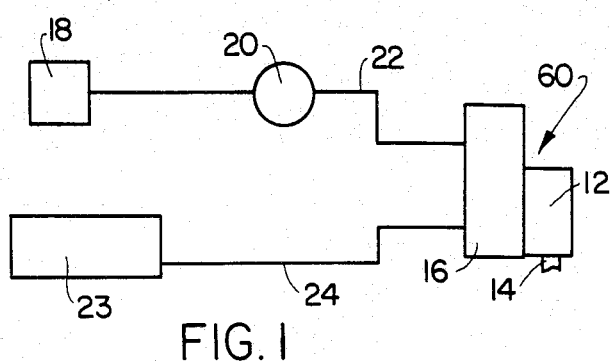
FIG. 1
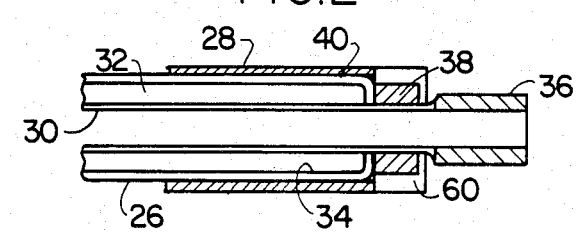
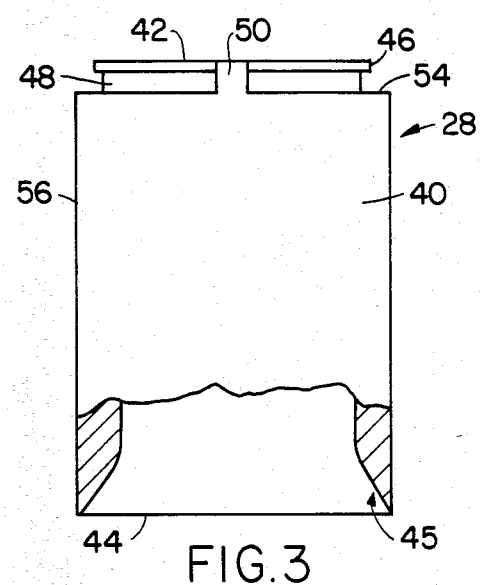
FIG. 3
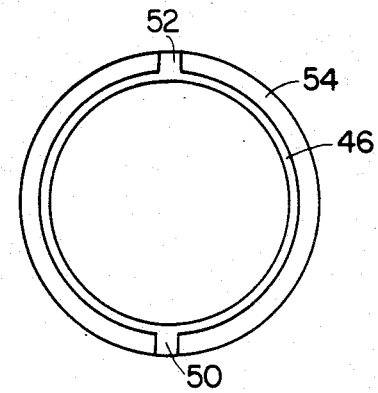
FIG. 2
FIG. 4
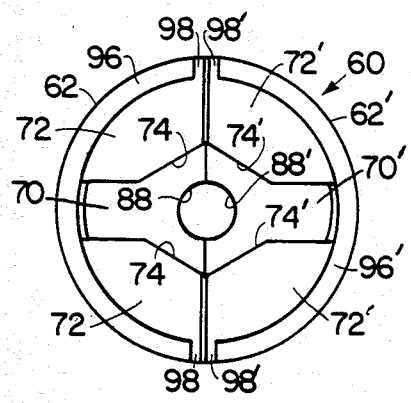
FIG. 6
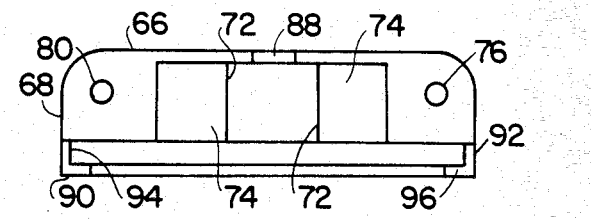
FIG. 5

HOT MELT ADHESIVE HOSE CUFF

BACKGROUND OF THE INVENTION

The invention relates to heated hoses for transporting molten hot melt adhesives. In particular, the invention relates to a hose cuff positioned at the end of a heated hose for transporting molten hot melt adhesives.

At the point where a hot melt hose terminates, it is necessary to use some sort of means to protect the electrical wires or the electrical connections to a source of electrical power. It is also necessary to use some sort of means to protect the flexible hose itself.

In the past, persons have used heat shrink tubing positioned at the end of the hose as a protector. In order to affix the tubing to the hose, heat must be applied to the tubing to cause it to shrink. Sometimes the application of heat to the tubing can damage the hose material itself. This is an undesirable result of using a heat shrink tubing type of hose cuff.

A heat shrink tubing type of hose cuff remains flexible after being affixed to the hose. Such a hose cuff is not rigid so that it flexes with the flexing of the hose. Consequently, the heat shrink tubing type of hose cuff does not significantly reduce stress or strain on the hose at the point where the hose connects to the hose fitting. Its inability to significantly reduce this stress or strain is also an undesirable result of using a heat shrink tubing type of hose cuff.

SUMMMARY OF THE INVENTION

The invention is a hose cuff for a hose. The hose cuff comprises a cylindrical body open at both ends. The hose passes through the hose cuff. The cylindrical body contains an external channel adjacent one end of the body. A collar is received within the external channel after the body is positioned on the hose. The collar further includes an engagement means for engaging the hose so as to prevent relative rotational movement between the hose and the hose cuff.

BRIEF DESCRIPTION OF THE DRAWINGS

Further objects and features of the invention will be apparent from the following description of an embodiment of the invention in connection with the accompanying drawings. It should be understood that this description is in no way limiting and that various changes may be brought to the disclosed embodiment without departing from the scope of the invention.

FIG. 1 is a mechanical schematic view of a system for the application of molten hot melt adhesive;

FIG. 2 is a schematic cross-sectional view of a section of a heated hot melt hose with the hose cuff affixed thereto;

FIG. 3 is a side view of the cylindrical body of the hose cuff;

FIG. 4 is a top view of the cylindrical body of the hose cuff;

FIG. 5 is a side perspective view of the interior surface of one piece of the two-piece collar; and FIG. 6 is a bottom perspective view of the interior surface of both pieces of the two-piece collar.

DETAILED DESCRIPTION OF A SPECIFIC EMBODIMENT

Referring to FIG. 1, a system for dispensing molten hot melt adhesives is illustrated in a schematic fashion. The system includes an automatic dispenser generally designated as 10. Automatic dispenser 10 includes a gun module 12 having a dispensing nozzle 14, and a service block 16. Gun module 12 is connected to service block 16. Automatic dispenser 10 may be a Model H-20 or H-200 automatic gun sold by Nordson Corporation of Amherst, Ohio 44001 (assignee of the instant patent application).

Gun module 12 includes a valve that is pneumatically operated. The supply of air from an air source 18 to operate the valve is controlled by the operation of a solenoid valve 20. A pneumatic line 22 connects the air source to the dispenser.

Molten hot melt adhesive is supplied to the dispenser from a hot melt adhesive application unit 23. Application unit 23 can be a hot melt adhesive application unit such as the Model HM IV sold by Nordson Corporation of Amherst, Ohio. Unit 23 is connected to dispenser 10 by means of an electrically heated hot melt hose 24.

Referring to FIGS. 2-6, hot melt hose 24 includes a flexible hose section 26 and a rigid hose cuff 28 at both ends thereof. The hose section is of a conventional construction such as that found in commercially available hot melt hoses sold by Nordson Corporation of Amherst, Ohio. However, briefly speaking, hose section 26 includes a central conduit 30 which is surrounded by layers of insulation and electric heaters. The insulation and heaters are generally designated as 32. A protective external covering 34 surrounds the hose section.

A fitting 36 is connected at each end of the hose section. As illustrated in FIG. 2, fitting 36 communicates with central conduit 30. Fitting 36 further includes a hexagonal shoulder 38 adjacent the hose section.

Hose cuff 28 is made from a rigid plastic material. Cuff 28 includes a cylindrical body 40 having opposite ends 42 and 44. Body 40 includes a section 46 having a reduced external diameter adjacent one end 42 thereof. Reduced diameter section 46 contains a channel 48 therein that extends around the circumference of section 46. A pair of oppositely disposed projections 50 and 52 divide channel 48 into two semi-circular sections. A shoulder 54 joins reduced external diameter section 46 with the enlarged external diameter section 56 of cylindrical body 40. As illustrated in FIG. 3, the wall of body 40 located adjacent end 44 is tapered at 45 so as to facilitate the positioning of the hose cuff on hose section 26.

Hose cuff 28 further includes a two-piece collar 60 made from the same rigid plastic material as body 40. Collar 60 is comprised of two corresponding semi-circular collar elements 62 and 62'. Since the collar elements are essentially identical, the description of collar element 62 will suffice for the description of collar element 62'. Referring to FIGS. 5 and 6, collar element 62 includes a wall having top 66 and side 68 portions joined by a rounded shoulder. The interior surface 70 of collar element 62 defines a pair of lobes 72. Lobes 72 are an integral part of collar element 62. Each lobe 72 includes an engagement surface 74. One lobe 72 includes a passage 76 passing completely through the collar element. Passage 76 has opposite open ends. The other lobe 72 includes a passage 80 having only one open end.

Top wall portion 66 includes a semi-circular aperture 88 therein. The edge 90 of side wall portion 68 terminates a certain distance past lobes 72 so as to form a depending wall portion 92. A lip 96 projects radially inwardly from edge 90 resulting in the definition of a recess 94. Depending wall portion 92 includes a notch 98 at the opposite ends thereof.

Cylindrical body 40 is fitted over hose section 26 adjacent one end of the hose section. The tapered wall 45 of body 40 facilitates the positioning of body 40 on hose section 26.

Once body 40 is positioned on hose section 26, collar elements 62 and 62' are fitted onto body 40 so that lips 96 and 96' are received within their corresponding semicircular channel sections. When collar elements 62 and 62' are pushed together, the engagement between lips 96 and channels 48 prevents relative movement therebetween along the longitudinal axis of body 40. Projections 50 and 52 are received within the space defined by opposite corresponding notches 98 and 98'. The consequence being that relative rotational movement between the collar 60 and cylindrical body 40 is prevented.

It should also be pointed out that once collar elements 62 and 62' are positioned on body 40, the top wall portions 66 and 66' are contained between hexagonal portion 38 of the fitting and the remainder of fitting 36. The consequence of this is that the hose cuff cannot move relative to the hose along the longitudinal axis of the hose cuff. Further, lobes 74 engage hexagonal portion 38 of the fitting so as to prevent any relative rotational movement between the hose and the hose cuff.

A conventional one-way screw (not illustrated) passes through each corresponding pair of passages 76 and 80 so as to: (a) secure collar elements 62 and 62' together and (b) secure collar elements 62 and 62' to cylindrical body 40.

It can thus be appreciated that hose cuff 28 is affixed to hose section 26 without the use of heat such as is required when shrink tubing is used. Consequently, any possibility of damage to the hose section caused by the application of heat is eliminated.

It can also be appreciated that due to the rigidity of cylindrical body 40 and collar 62, stresses and strains at the location where the hose material joins the fitting caused by flexing the hose are reduced.

While I have disclosed specific embodiments of my invention, persons skilled in the art to which this invention pertains will readily appreciate changes and modifications which may be made in the invention. Therefore, I do not intend to be limited except by the scope of the following appended claims.

I claim:

1. A hose cuff for a hot melt hose of the type having a rigid connector on at least one end thereof, said hose cuff comprising a cylindrical body open at both ends to receive one end of a hot melt hose, said body having an annular, external channel contained therein adjacent one of said ends and including a pair of oppositely disposed protrusions within said channel thereby dividing said channel into two semicircular sections, and a collar divided into two halves and having a rim thereon receivable within said channel of said body such that relative axial and rotational movement between said collar and said body is prevented, said collar further including means for engaging the rigid connector so as to prevent relative rotational movement between the hose and said collar and means for fastening said halves together so that said collar is fixed to said cylindrical body.

2. The hose cuff claimed in claim 1 wherein said rigid connector includes a shoulder which is hexagonal and said collar is configured internally to engage said shoulder to prevent relative rotational movement.

3. The hose cuff claimed in claim 2 wherein the end of said cylindrical body portion opposite said external channel is tapered on its radially inner surface to facilitate the positioning of said cylindrical body on the hose.

* * * * *